United States Patent [19]
Harvey

[11] Patent Number: 4,498,447
[45] Date of Patent: Feb. 12, 1985

[54] GASOLINE VAPORIZER FOR INTERNAL COMBUSTION ENGINE

[76] Inventor: Richard Harvey, 10828 Buggywhip Dr., Spring Valley, Calif. 92078

[21] Appl. No.: 539,647

[22] Filed: Oct. 6, 1983

[51] Int. Cl.³ .............................................. F02M 31/00
[52] U.S. Cl. ................................... 123/557; 123/523; 165/52
[58] Field of Search ............... 123/557, 523, 524, 522, 123/525, 576, 575, 578; 165/52, 51

[56] References Cited
U.S. PATENT DOCUMENTS

| | | | |
|---|---|---|---|
| 577,189 | 2/1897 | Lewis | 123/557 |
| 1,980,496 | 11/1934 | Musselwhite | 123/523 |
| 2,285,905 | 6/1942 | Cunningham | 123/523 |
| 2,882,882 | 4/1959 | Pantano | 123/523 |
| 3,886,919 | 6/1975 | Freeman | 123/557 |
| 4,350,134 | 9/1982 | Sparks | 123/557 |
| 4,386,596 | 6/1983 | Tuckey | 123/557 |
| 4,401,095 | 8/1983 | DuLoft | 123/523 |
| 4,422,429 | 12/1983 | Reed | 123/557 |
| 4,429,675 | 2/1984 | Talbert | 123/557 |

*Primary Examiner*—Ronald H. Lazarus
*Attorney, Agent, or Firm*—Charmasson & Holz

[57] ABSTRACT

A gasoline vaporizer associated with the carburetor of an internal combustion engine designed to improve the engine efficiency by delivering gasoline vapor directly to the carburetor.

A portion of the fuel supplied by the fuel pump is diverted through a metering valve to a close chamber where it is sprayed over copper tubing through which hot water from the engine cooling system is circulated.

Gasoline vapors thus produced are drawn into the venturi of the carburetor by the engine suction, or injected directly into the intake manifold.

5 Claims, 8 Drawing Figures

U.S. Patent   Feb. 12, 1985   Sheet 1 of 2   4,498,447
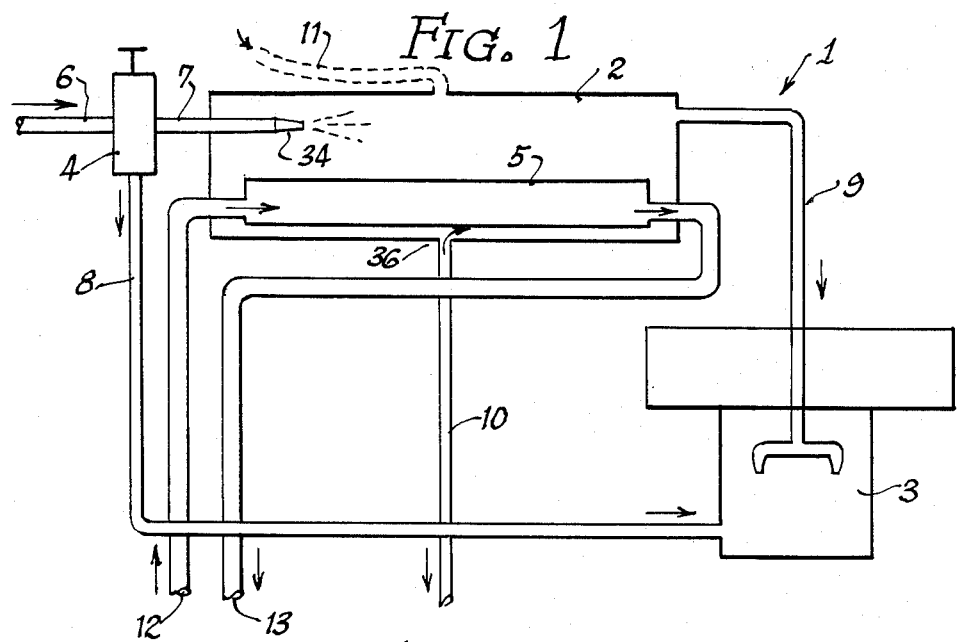
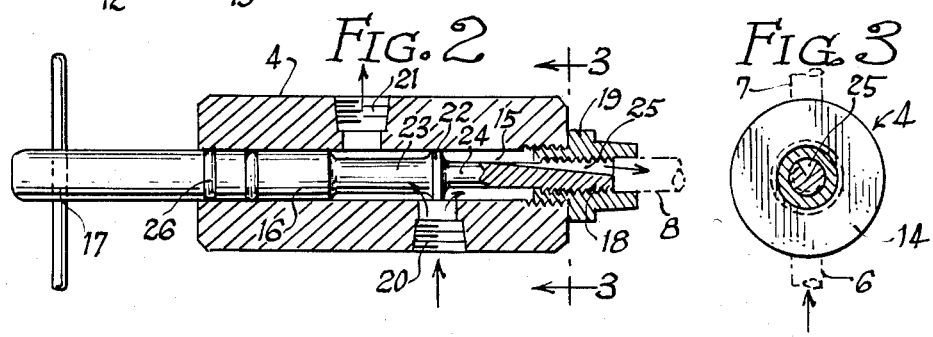

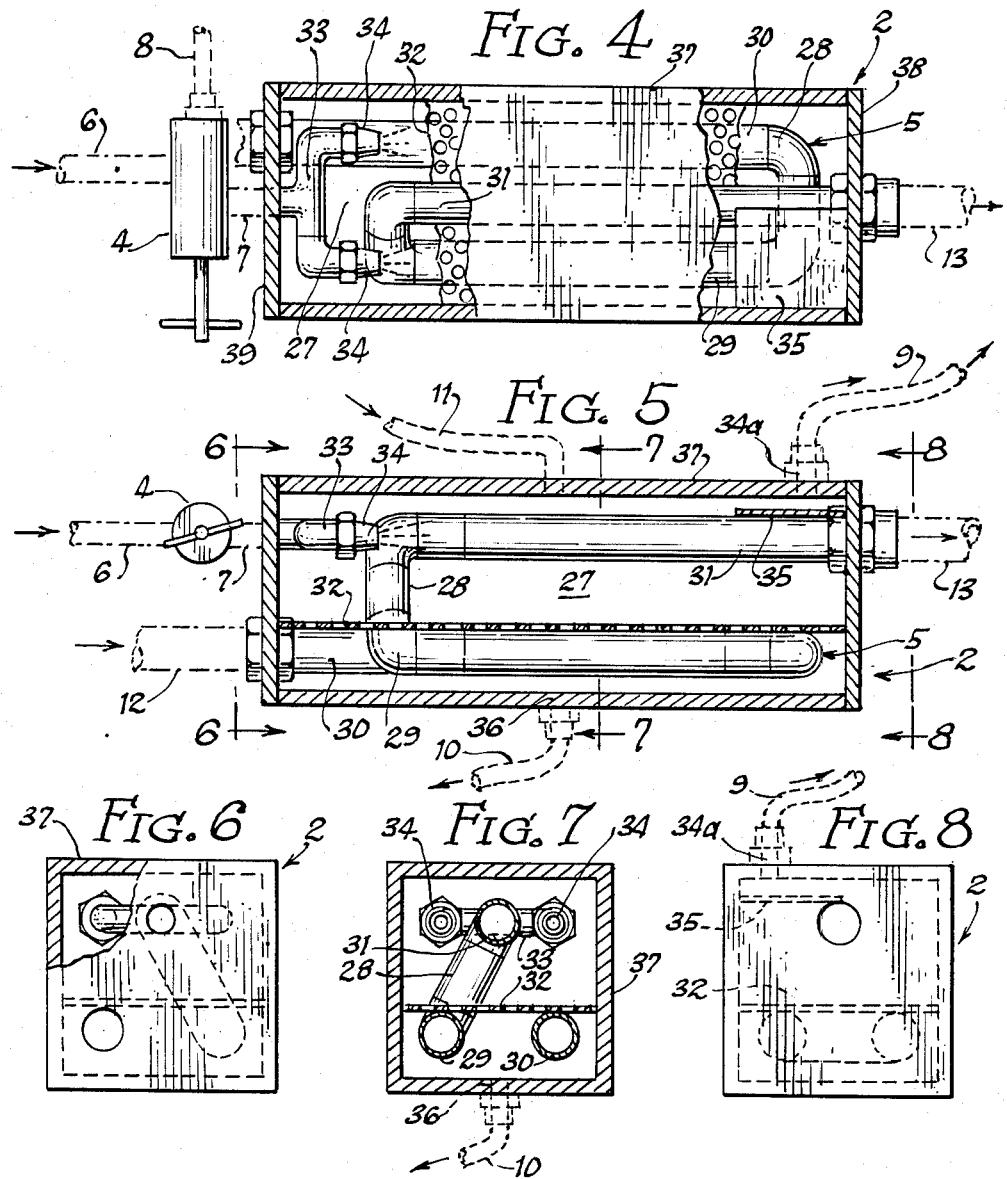

GASOLINE VAPORIZER FOR INTERNAL COMBUSTION ENGINE

FIELD OF THE INVENTION

This invention relates to internal combustion engine carburetion systems, and more specifically to carburetion systems with gasoline pre-heating and vaporizing devices.

BACKGROUND OF THE INVENTION

It is axiomatic that the efficiency of a gasoline-powered engine can be improved by a more complete burning of the air-fuel mixture.

Carburetors are designed to homogenize the mixture by atomizing the fuel. Cylinder heads are sometimes shaped to further improve homogenization by causing the mixture to whorl inside the cylinder during the admission and compression cycles.

The addition of gasoline vapors to the mixture causes additional dispersing effects which bring more fuel molecules in direct contact with the oxygen of the air for a more thorough combustion.

SUMMARY OF THE INVENTION

The principal object of this invention is to provide a means for vaporizing a portion of the gasoline admitted into a combustion engine.

Another object of this invention is to provide a means for conveniently metering the amount of fuel to be vaporized.

A further object of the invention is to provide a simple and practical vaporizing device which can be readily added to existing combustion engine carburetion systems, without having to modify the existing carburetor.

These and other useful objects are achieved by a metering valve which diverts part of the fuel going to the carburetor toward a closed chamber in which the diverted fuel is sprayed against hot water ducts in order to create a gasoline vapors which are then injected into the venturi section of the carburetor, or directly into the intake manifold.

BRIEF DESCRIPTION OF THE DRAWINGS

FIG. 1 is a general diagram of the vaporizing system;

FIG. 2 is a cut-away view of the metering valve;

FIG. 3 is a cross-sectional view of the valve taken along lines 3—3 of FIG. 2;

FIG. 4 is a top plan view of the vaporizer with cut-away portion showing the internal components;

FIG. 5 is a front elevational view of the vaporizer with the front plate removed;

FIG. 6 is a side view taken along lines 6—6 of FIG. 5;

FIG. 7 is a cross-sectional view taken along lines 7—7 of FIG. 5; and

FIG. 8 is a side view taken along lines 8—8 of FIG. 5.

DESCRIPTION OF THE PREFERRED EMBODIMENT OF THE INVENTION

Referring now to the drawings and beginning with FIG. 1, there is illustrated the general diagram of the vaporizing system 1. Gasoline delivered by the engine fuel pump is brought by line 6 to a metering valve 4 which diverts part of the fuel through line 7 toward the vaporizer chamber 2. The remainder of the fuel is applied through line 8 to the regular gasoline inlet of the engine carburetor 3. Inside the vaporizing chamber 2 the gasoline is sprayed over a heating element 5. Hot water from the engine cooling system is circulated through the heating element 5 by way of lines 12 and 13. Alternate systems could also be implemented using the engine exhaust or an electrical coil to heat the element 5. The gasoline vapors whorling in the chamber 2 are drawn into the venturi section of the carburetor 3 through line 9. A drain line 10 at the bottom of the chamber 2 return any excess, unvaporized gasoline toward the fuel tank. An air inlet is sometimes provided through line 11 in the upper section of the chamber 2. The valve 4 can be adjusted to apportion the amount of gasoline delivered to the chamber 2 and to the carburetor 3.

Vapors will not be produced until the engine cooling system reaches a certain temperature. Therefore it is preferable not to admit fuel into the chamber 2 until such time. The adjustment of the metering valve 4 may be predicated upon the type of engine, the richness of the desired fuel mixture and various other factors. Manual or automatic adjustments may be devised according to circumstances. For best results the gasoline vapors should be delivered directly into the venturi section of the carburetor, or into the intake manifold. However, satisfactory operation can also be obtained by delivering the gasoline vapors directly ahead of the choke.

FIGS. 2 and 3 illustrate the construction of the metering valve 4. The valve comprises a cylindrical body 14 through which runs an axial bore into which is engaged a shaft 16. One end of the shaft protruding from the valve body 14 has a handle 17. The other end of the shaft is threaded and engages the internal threads of a coupling 19 forming an axial outlet port for line 8. A first radial bore 20 closest to the threaded coupling 19 receives the fuel from the fuel pump through line 6. A second radial bore 21 delivers the fuel to line 7 toward the vaporizer chamber 2. A gate 22 defined by an annular barrier having two smaller diameter sections 23 and 24 on either side thereof can be adjusted to span the diameter of inlet bore 20. A slanted axial notch 25 is cut into the threaded tip 18 of the shaft 16 allowing fuel to pass through coupling 19 depending upon the axial position of the shaft within the cylindrical body 14. Accordingly, by turning handle 17 the quantity of fuel admitted through bore 20 can be apportioned between the carburetor line 8 or the vaporizer line 7 to operate the engine on liquid fuel only, vapors only or a combination of both. O rings 26 near the outer end of the shaft 16 prevent any leakage of fuel. The notched tip 18 provides for a fine adjustment of the fuel flow toward the carburetor.

FIGS. 4 through 8 illustrate the construction of the vaporizer chamber 2. The vaporizer 2 is contained within an hermetic chamber 27 having a generally rectangular shape. The heating element 5 comprise a copper pipe 28 which connects to line 12 in the lower part of the chamber and is doubled back upon itself twice in order to span the length of the chamber three times. Two sections 29 and 30 are in the same horizontal plane close to the bottom of the chamber 2. An upper section 31 stretches across the upper median part of the chamber, and connects to line 13. A grid 32 forms a perforated septum in contact with the lower sections 29 and 30. A T-coupling 33 connected to line 7 leads to a pair of nozzles 34 directed horizontally above the areas of the grid 32 contiguous to pipe sections 29 and 30. The vapor outlet 34a connected to line 9 is located in the roof of the chamber 2 a shield plate 35 located immediately under outlet 34a and at a short distance therefrom prevents the suction into line 9 of gasoline which might be sloshing around the lower part of the chamber. The drain outlet 36 located at the bottom of the chamber 2 connects to drain line 10. The optional air intake is provided through line 11 which enters the chamber through the median section of the chamber roof.

The grid 32 is designed to provide a broad heating element against which the gasoline is sprayed. The excess gasoline which does not evaporate collects at the bottom of the chamber and is drained away through line 10. The upper section 31 of the heating pipe is designed to maintain a high temperature in the upper part of the chamber and thus expedite and maintain the vaporization process. The air intake line 11 may be brought to a convenient place within the engine compartment or outside it and may be fitted with a filtering mesh to prevent intake of dust and debris.

In this preferred embodiment the chamber is made from a rectangular extrusion section closed at both ends by end plates 38 and 39 which are maintained in place by the couplings between the heating pipe 28 and the water lines 12 and 13.

In certain applications, the carburetor could be completely omitted and the engine operated only on the vapors generated through the vaporizer 2.

While the preferred embodiment of the invention has been described other embodiments may be devised and modifications may be made thereto without departing from the spirit of the invention and the scope of the appended claims.

What is claimed is:

1. A vaporizing apparatus for use in connection with the carburetor of a gasoline internal combustion engine which comprises:
   a closed chamber having a gasoline inlet and a vapor outlet;
   heating means within said chamber;
   means for diverting a portion of the fuel supplied to the carburetor into said outlet;
   means associated with said inlet for spraying said fuel against said heating means in order to produce vapors;
   ducting means to deliver said vapors into the carburetor wherein: said means for diverting comprises:
   a metering valve having an inlet port and first and second outlet ports;
   an adjustable gate controlling the distribution of fuel admitted through said inlet between said outlet ports; and
   ducting means connecting said inlet port to a pressurized fuel supply, said first outlet port to the fuel inlet of the carburetor and said second outlet port to the gasoline inlet chamber said heating means comprises a pipe through which a hot fluid derived from the engine cooling system is circulated; and
   said chamber comprises a perforated septum lying horizontally across the lower half of the chamber;
   said pipe is in contact with said septum;
   said means for spraying includes at least one nozzle located above said septum.

2. The apparatus claimed in claim 1 wherein said chamber has a draining outlet located at the bottom and ducting means connecting said drain outlet to the fuel tank of the engine.

3. The apparatus claimed in claim 1 wherein said metering valve comprises:
   a cylindrical body having an axial bore and first and second radial bores axially spaced apart;
   a shaft engaged into the axially bore from one end of the cylinder body;
   a part of said shaft protruding from said one end and having means for rotating the shaft;
   an internally threaded coupling forming said first outlet port engaged into said axially bore at the other end of the cylinder body;
   the tip of said shaft having a radial notch and threads engaging said threaded coupling; and
   said gate comprises an annular barrier on said shaft, said barrier having adjustable axial positions spanning the diameters of the radial bore closest to said threaded coupling.

4. The apparatus claimed in claim 3 wherein said radial bore closest to said threaded coupling forms the inlet port of the chamber.

5. A vaporizing apparatus for use in connection with the carburetor of a gasoline internal combustion engine which comprises:
   a non-pressurized chamber, not in the path of the air supply line to the carburetor, having a gasoline inlet, a vapor outlet and a perforated septum lying horizontally across the lower half of the chamber;
   heating means within said chamber comprising a pipe in contact with said septum through which a hot fluid is circulated;
   means for diverting a portion of the fuel supplied to the carburetor into said inlet comprising
   a metering valve having an inlet port, first and second outlet ports, and an adjustable gate controlling the distribution of fuel admitted through said inlet port between said outlet ports; and
   ducting means connecting said inlet port to a pressurized fuel supply, said first outlet port to the fuel inlet of the carburetor and said second outlet port to the gasoline inlet of the chamber;
   at least one nozzle located above said septum associated with said inlet for spraying said fuel against said heating means in order to produce non-pressurized vapors; and
   ducting means to deliver said vapors drawn by the engine vacuum into the carburetor.

* * * * *